Nov. 5, 1968  K. MacGREGOR SWANSON  3,409,503
NUCLEAR REACTOR FUEL ELEMENTS
Filed Dec. 19, 1966
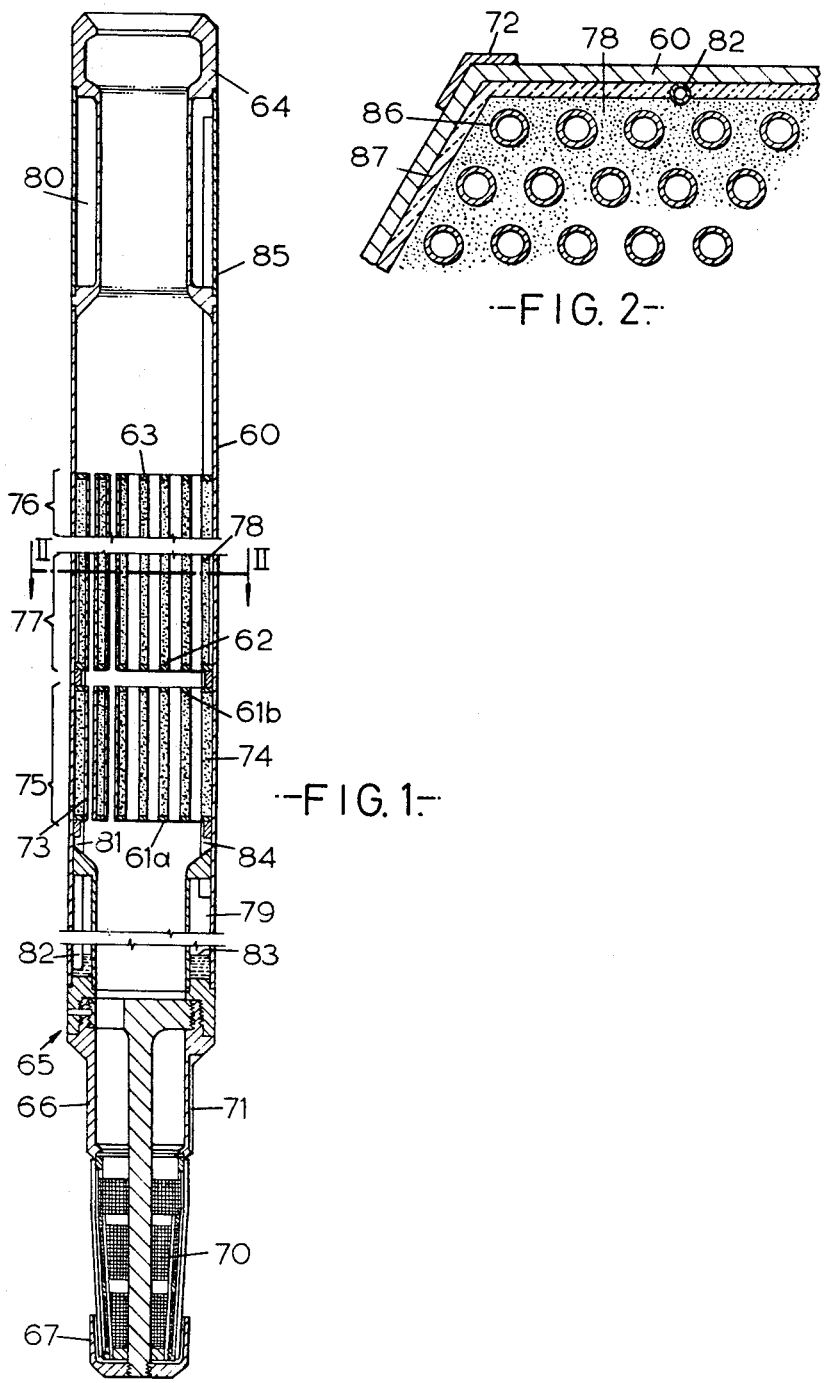

3,409,503
NUCLEAR REACTOR FUEL ELEMENTS
Kenneth MacGregor Swanson, Thurso, Caithness, Scotland, assignor to United Kingdom Atomic Energy Authority, London, England
Filed Dec. 19, 1966, Ser. No. 602,988
Claims priority, application Great Britain, June 23, 1966, 28,202/66
3 Claims. (Cl. 176—68)

ABSTRACT OF THE DISCLOSURE

A fast nuclear reactor fuel element has sheathing forming internal and external walls, both being exposed to the same flowing coolant, ceramic nuclear fuel contained in the sheathing and being less than theoretical density so as to provide distributed voidage, and a layer of thermal insulating material between the fuel and the inner face of the external wall, the fuel contacting the inner face of the internal wall closely, whereby the operating temperature of the fuel adjacent the insulating layer is raised compared with that of the fuel adjacent the internal wall so as to lower the compressive creep resistance of the portion of fuel operating at higher temperature and so induce irradiation-induced swelling to be absorbed in the distributed voidage of the fuel. The concept is particularly applicable to the case where the external wall of the sheathing is constituted by a shell and where coolant tubes within the shell form the internal wall of the sheathing.

---

The present invention concerns nuclear reactor fuel elements having ceramic fuel in metallic sheathing; the fuel elements contemplated by the invention are considered particularly suitable for use in fast reactors. A ceramic fuel is a refractory chemical compound of uranium, plutonium or both, with or without added non-fissile compounds. Current research on ceramic fuels, such as mixed uranium/plutonium dioxide and monocarbide, is showing that fuel swelling in fast reactors can be a prime cause of fuel element sheathing failure and thereby produce a limit on attainable burn-up of heavy atoms. There are strong economic incentives to achieve as high a fraction of heavy burn-up as possible in fast reactors.

It is an object of the invention to mitigate the effects of irradiation-induced swelling in the fuel and so enable the burn-up limit to be increased.

In an application of even date by J. P. Ellington, Ser. No. 602,927, filed Dec. 19, 1966, there is put forward the concept of the fuel at its design heat output rating being as far as possible so hot as to assume a temperature-induced plasticity, or state of low creep resistance, which enables swelling resulting from irradiation to be accommodated internally of the fuel.

The present invention is based on the realisation that it is unnecessary for internal cooled surfaces of the fuel to be as hot as this because solid swelling at this surface tend to be outwards rather than inwards. Accordingly, in one of its aspects, the invention provides a nuclear reactor fuel element containing ceramic fuel which element presents cooled surfaces internally as well as externally; sheathing of the element is arranged to impose restraint on the external surface and is constructed as to be of poorer thermal conductivity than sheathing at the internal surface. Consequently the external surface temperature in operation is higher than the internal surface temperature to an extent whereby, in conjunction with voidage included in the fuel, any swelling of the fuel in the region of the external surface can be absorbed internally of the fuel.

Present indications are that an external fuel surface temperature not below 1,000° C. would be appropriate to ensure that the internal absorption of swelling may be achieved with certainty for a fuel like a fissile dioxide. In an elongated element it is generally not feasible or even necessary to aim for such a high surface temperature towards the ends of the element. Typically there is a downward temperature gradient towards the ends which results from a lowering of neutron flux density and hence fission rate in the fuel. The lower fission rate implies less swelling tendency and hence less need for measures to avoid swelling at the external surface. The main aim should therefore be to obtain the 1000° C. minimum external fuel surface temperature at least in the maximum burn-up region of the element; such region is typically at the mid-length of the fuelled section of an employment element.

With sheathing of metal, such as stainless steel or a nickel alloy, the construction of the external surface sheathing for bringing about the requisite higher temperature will call for an interlayer which can act, on the one hand, as thermal insulation and yet offer, on the other hand, a sufficient solidity to impose restraint on the external fuel surface. The interlayer is conveniently an inert refractory material, preferably one with a thermal conductivity less than that of the fuel.

Fuel elements in accordance with the invention may be constructed in tubular form, that is to say, with coaxial inner and outer sheaths and fuel in the space between them, or they may be constructed in a form which is rather like a calandria in that a fuel container or shell is penetrated by a plurality of coolant flow tubes which represent the internal surface sheathing. The latter constructional form is conveniently called a "tube-in-shell" fuel element, and it has the advantage over the tubular form that the volume fraction of sheathing material can be less.

It is with reference to a particular example of a tube-in-shell fuel element that the invention will be further described, this example being illustrated in the accompanying drawings, in which:

FIGURE 1 is a longitudinal section on the fuel element, and

FIGURE 2 is a scrap transverse section taken on the line II—II of FIGURE 1 to an enlarged scale.

The illustrated fuel element has been designed for a fast reactor cooled by a low melting point metal assumed for the purposes of the present example to be sodium. The sheathing of the element comprises an external hexagonal shell 60 of which the interior is divided at intervals by partitions, such as 61a, 61b, 62 and 63, constructed in the manner of the tube plates. Surmounting the shell there is a top fitting 64 and at the opposite end there is a bottom fitting 65 comprising spaced cylindrical bearing surfaces 66 and 67 for fitting into a socket of a reactor core support structure. Between the bearing surfaces 68 and 69 there is a stainless steel knitmesh filter 70 which enables coolant from an inlet plenum incorporated into the reactor core support structure to enter into the bottom of the shell 60 and to be forced to flow upwards therein for internal cooling. For external cooling a flow of coolant is allowed to pass between the cylindrical bearing surface 66 and the complementary engaging surface of the socket in which the fuel element is fitted; appropriate tolerances on these surfaces may suffice to establish the requisite external cooling flow but, as illustrated, it may be preferred to utilise performed passages as represented by the groove indicated at 71. Only narrow gaps are available between the element and its neighbours in the core, these gaps being predetermined by the pitch of the sockets in the reactor core support structure and by corner abutments such as 72 (FIGURE 2) projecting from the shell 60 at one or more positions along the length of the element. Apart from the corner abutments, these gaps are unobstructed and therefore the external cooling flow of coolant proceeds through these gaps as a relatively thin flowing layer of which the flowrate is preset, as by the grooves 71, to obtain an outlet temperature close to that of the internal cooling flow.

Between the partitions 61a and 61b extend open-ended coolant tubes, such as 73, arranged in a parallel relationship on a triangular pitch. These tubes are sealed to the partitions 61a and 61b and filling the space between them is a breeder material 74 so that in effect the section indicated 75 lying between these partitions is a mass of breeder material penetrated by coolant tubes. The section 75 constitutes a lower breeder section and an upper breeder section 76 is similarly constituted between the partition 63 and another intermediate partition not appearing in the drawings. Between the upper and lower breeder sections is a fuel section 77 extending between the partition 62 and yet another intermediate partition not appearing in the drawings, the relationship of the non-illustrated partitions being the same as that of the partitions 61b and 62. The space between the pairs of intermediate partitions, such as 61b and 62, allows intersection mixing of coolant and prevents a tube blockage in one section affecting the other sections as well. Furthermore, the sub-division into different unconnected sections shortens the tube length by comparison with the case where the tubes run continuously through the fuel and breeder material and consequently differential thermal expansion between the tubes and the shell can be more readily accommodated.

The fuel section 77 is longer than the upper and lower breeder sections but the coolant tube arrangement is the same. The filling between the tubes is of fuel 78 up to a level close to the top of the fuel section. In order that the shell does not have to be exposed to internal pressures built up by gases released from the fuel in service, the fuel section is adapted for venting of these gases, preferably to the coolant.

Adjacent both the top and bottom fittings 64 and 65 the shell is of double wall construction to form a scrubber chamber 79 and a lute chamber 80. A small bore vent pipe 81 lying against the inner surface of the shell 60 has a bottom end 82 opening into the scrubber chamber beneath a free surface 83 of a scrubber liquid contained in this chamber. This liquid is conveniently sodium for the retention of caesium fission products but other liquids could be used according to the products sought to be retained. Remote from the bottom end 82, the vent pipe 81 opens into the fuel section 77. The vent path is completed by a second vent pipe 84, which opens at opposite ends respectively into the upper regions of the scrubber and lute chambers, and by several apertures, such as the one indicated at 85, by which a lower region of the lute chamber is placed in communication with the outside of the shell and hence with the flow of coolant.

The volume of the lute chamber must be such that coolant entering through the apertures 85 at full load pressure cannot reach the top of the second vent pipe 84 by compression of gas in the vent path, even where such gas is cold. Consequently the combination of second vent pipe and lute chamber acts in the manner of a diving bell to ensure that coolant cannot proceed further back along the vent path than the lute chamber. However the gases released from the fuel can bubble through the scrubber liquid from the bottom of the vent pipe 81 and by depression of the level of coolant in the lute chamber to the level of the apertures 85 can ultimately escape to the flowing coolant outside the element. The vent path can also serve the breeder sections simply by extending the vent pipe 81 into the upper breeder section and arranging that the pipe has an opening into each of the three sections.

Considering the fuel section in greater detail, it will be seen by reference to FIGURE 2 that the shell wall 60 is rendered a poorer thermal conductor than the coolant tubes, here indicated 86, by virtue of an insulating interlayer 87 of a solid thermal insulating material. In conjunction with this measure to increase the external fuel surface temperature, there must be distributed voidage in the fuel itself. Based on the provision of between 1 and 2% voidage per designed percent maximum burn-up of heavy atoms, an aggregate voidage amounting to at least 15% of the fuel volume is considered appropriate. This voidage may be included as microporosity in the fuel, this being obtainable by sintering to less than theoretical density and/or by adjustment of the packing density of fuel powder of granules, or it may be included by the shaping of fuel pellets in such a way that gaps are left in or between pellets in places where fuel, which becomes hot enough to be in the so-called "soft" state, can be squeezed into the gaps.

For the purposes of the present example the fuel is assumed to be $(UPu)O_2$, possibly to a slightly non-stoichiometric composition, which is packed, without additives, in granular form to a packing density prevailing substantially uniformly throughout the fuel section of about 80% of maximum theoretical density or even perhaps less. A good insulating material for the interlayer 87 is zirconia, preferably stabilised with calcium oxide for resistance to damage by neutron irradiation. Although alumina does not have such a low conductivity as zirconia, the interlayer is required to impose lateral restraint on the fuel and the possibility of greater strength in alumina may make it preferable in a tube-in-shell fuel element, as illustrated, where the interlayer thickness is less affected by space considerations. Other possible insulating materials are beryllia, pyrolytic carbon with its minimum conductivity direction perpendicular to the adjoining fuel surface, and magnesia, the last-mentioned being appropriate for a monocarbide fuel. Compatability with the fuel and sheathing if of course an important consideration and therefore the particular composition of these materials will influence the choice of insulating material. In the present example the sheathing represented by the shell, partitions and coolant tubes is of stainless steel.

With a thickness of the interlayer sufficient to ensure that, at the design heat output rating, the external fuel surface temperature is at least 1,000° C. in at least the region of maximum burn-up in the fuel, there is created in all of the fuel in this region, with the exception of rims surrounding the coolant tubes, such reduced resistance to compressive creep that irradiation-induced swelling can be absorbed in the voidage of the fuel. This calls for only a relatively light restraining force on the part of the sheathing which is therefore relieved of much of the swelling force. An indication of the extent to which the compressive creep strength of ceramic fuels is reduced with increasing temperature can be gained from the paper by Armstrong et al. at pages 133 to 141 of Journal of Nuclear Materials, 7, No. 2 (1962).

It should be noted that the fuel in the region of the internal cooled surfaces, i.e. those which are sheathed by the tubes of the tube-in-shell construction or the inner sheath of the tubular construction, does not have to be so hot as it is in the region of the external cooled surface and therefore larger thicknesses of fuel can be used for a given maximum or centre temperature in the fuel. Furthermore, when using thermal insulant, this does not have to be provided at all cooled surfaces and therefore its presence is less of a sacrifice in space for fuel.

I claim:

1. A fuel element for a fast nuclear reactor comprising sheathing presenting internal and external walls for exposure to a flowing coolant, substantially unmoderated ceramic nuclear fuel contained in said sheathing and closely contacting the inner face of said internal wall, said ceramic fuel having a density which is less than 85% of the maximum theoretical density so as to include distributed voidage, and a layer of solid non-fissile thermal insulating material between said fuel and the inner face of the external wall of said sheathing and contacting all of said inner face for increasing the operating temperature of that portion of the fuel which it contacts to at least 1000° C., and above that of the fuel portion adjacent said internal wall so as to lower the compressive creep resistance of the fuel for inducing, in conjunction with the restraint offered by the engagement of the fuel with said inner face of the external wall through said layer of insulating material, absorption of irradiation-induced swelling within said distributed voidage of said fuel.

2. A fuel element according to claim 1, wherein the external wall of the sheathing provides a shell, the internal wall of the sheathing is constituted by a plurality of coolant tubes within the shell, the inner face of the shell has provided thereon said layer of thermal insulating material, and said ceramic fuel with distributed voidage is disposed within said shell in the space between said tubes and the inner face of said layer of insulating material.

3. A fuel element according to claim 2 further comprising a vent path establishing communication between the fuel space inside said shell and the exterior of the fuel element for venting, to the flowing coolant, gases released during operation by the fuel.

References Cited

UNITED STATES PATENTS

| 3,072,555 | 1/1963 | Barth et al. | 176—72 X |
| 3,156,625 | 11/1964 | Harty et al. | 176—72 X |
| 3,291,699 | 12/1966 | Trickett et al. | 176—69 X |
| 3,331,746 | 7/1967 | Margen | 176—72 X |

FOREIGN PATENTS

| 798,282 | 7/1958 | Great Britain. |
| 928,517 | 6/1963 | Great Britain. |

BENJAMIN R. PADGETT, *Primary Examiner.*

M. J. SCOLNICK, *Assistant Examiner.*